March 2, 1971  J. W. MEULENDYK  3,567,349
LOW SPEED HIGH TORQUE FLUID VANE MOTOR
Filed July 11, 1968  2 Sheets-Sheet 1
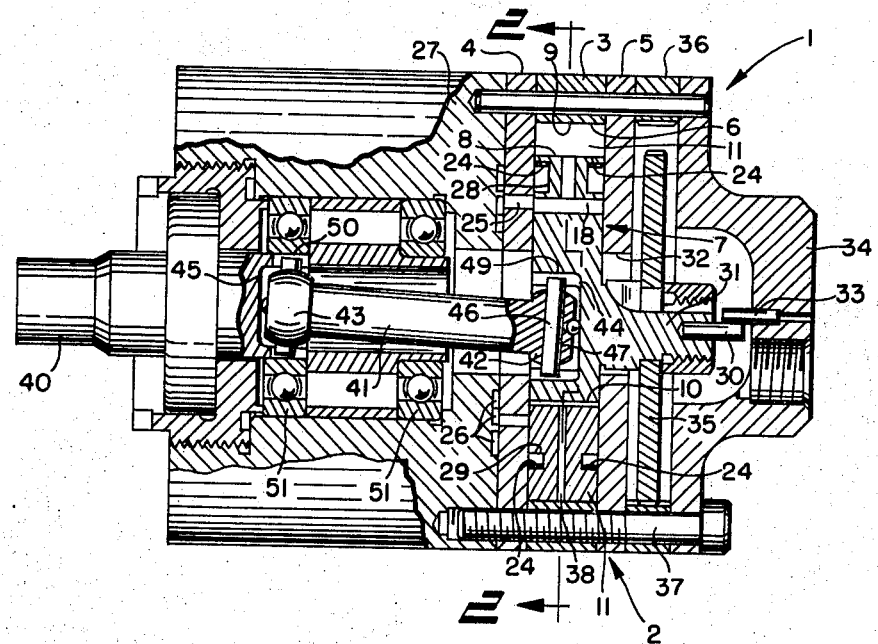
Fig. 1
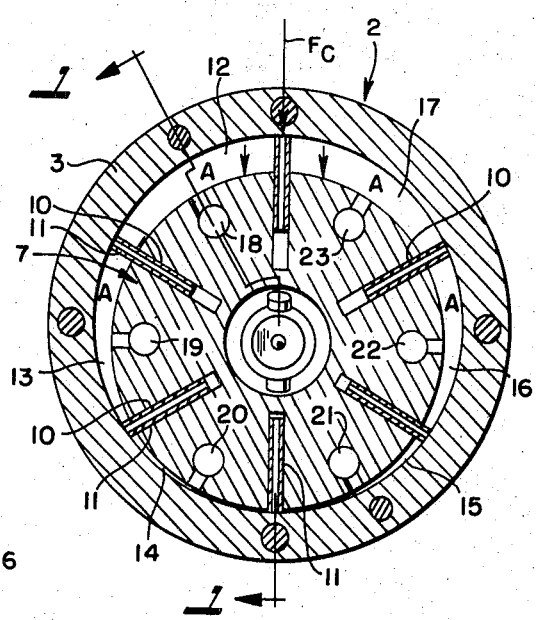
Fig. 2
Fig. 3
INVENTOR
JOHN W. MEULENDYK
BY  Stephen M. Mihaly
ATTORNEY March 2, 1971  J. W. MEULENDYK  3,567,349
LOW SPEED HIGH TORQUE FLUID VANE MOTOR
Filed July 11, 1968  2 Sheets-Sheet 2
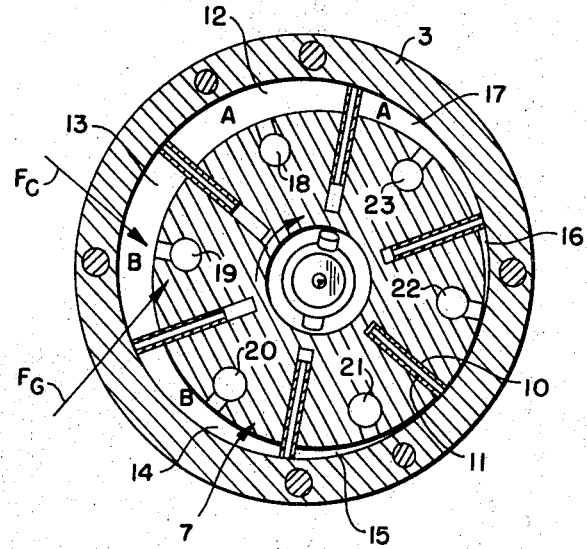
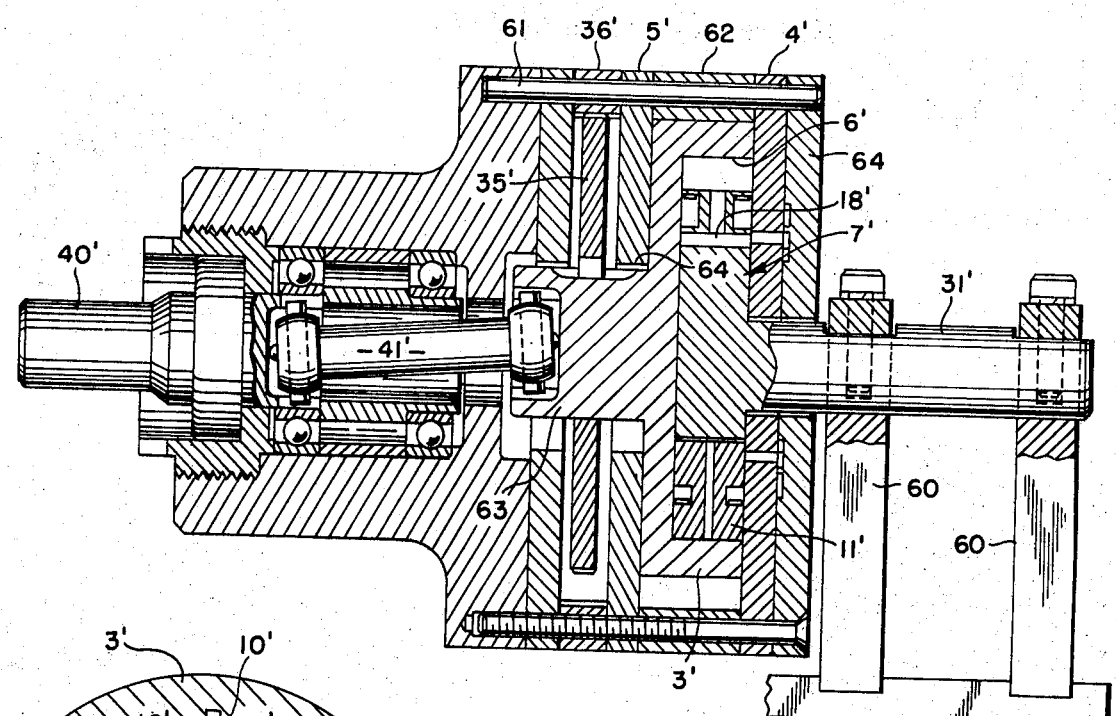
INVENTOR
JOHN W. MEULENDYK
BY
ATTORNEY

# United States Patent Office 3,567,349
Patented Mar. 2, 1971

3,567,349
LOW SPEED HIGH TORQUE FLUID VANE MOTOR
John W. Meulendyk, Kalamazoo, Mich., assignor to Pneumo Dynamics Corporation, Cleveland, Ohio
Filed July 11, 1968, Ser. No. 744,175
Int. Cl. F01c 1/04
U.S. Cl. 418—61                                          11 Claims

ABSTRACT OF THE DISCLOSURE

A fluid vane motor in which either the rotor or housing is caused to roll around the periphery of the other through a proper sequencing of pressures to the vane chambers.

BACKGROUND OF THE INVENTION

This invention generaly relates to a fluid vane motor of a very efficient and reliable nature, capable of producing a relatively high torque output at low speeds.

Conventional fluid vane motors include a rotor eccentrically mounted on a fixed axis within a housing which is driven at very high speeds to develop sufficient output power to drive a member coupled thereto through a speed reducer. However, because of the need to drive the rotor at such high speeds and the resulting high effective inertia of the rotor, the motor is very slow to respond to changes in torque demands, making it unsuitable for fast response pneumatic actuation systems. Moreover, the various parts of the motor are subjected to considerable friction and wear at such high rotor speeds, thus substantially shortening the life of the motor and reducing its efficiency.

SUMMARY OF THE INVENTION

It is accordingly a primary object of this invention to provide a fluid vane motor in which the relative rotational speed between the rotor and housing is quite slow, thereby substantially reducing the effective inertia of the rotating element thus permitting high acceleration.

Another object is to provide such a fluid vane motor in which the amount of fluid in the vane chambers is relatively low, thus making the motor particular suited for pneumatic applications requiring a high frequency response as in servo drives.

Still another object is to provide such a fluid vane motor which has a relatively low breakaway and running friction for reduced wear and increased efficiency and positioning accuracy.

These and other objects of the present invention may be accomplished by applying a large rotating couple force to the rotating element of the motor to cause the same to roll around the periphery of the stationary element. By making the rotor diameter only slightly smaller than the housing diameter, the reative rotation between the rotor and housing will be quite small for every complete pass of one of the elements around the periphery of the other thus creating a large torque-producing couple on the output shaft.

To the accomplishment of the foregoing and related ends, the invention, then, comprises the features hereinafter fully described and particuarly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWING

In the annexed drawing:
FIG. 1 is a longitudinal section through a preferred form of fluid vane motor constructed in accordance with this invention having an output shaft coupled thereto;
FIG. 2 is a transverse section through the rotor assembly of FIG. 1, taken on the plane of the line 2—2 thereof;
FIGS. 3 and 4 are transverse section similar to FIG. 2, but showing the rotor in different rotative positions within the housing;
FIG. 5 is a fragmentary transverse section of another form of fluid vane motor; and
FIG. 6 is a longitudinal section of still another form of fluid vane motor in accordance with this invention.

DESCRIPTION OF THE PREFERRED EMBODIMENTS

In FIG. 1 there is illustrated by way of example a fluid vane motor 1 generally consisting of a rotor housing 2 in the form of a cylinder 3 having a pair of plates 4 and 5 secured to its opposite ends thus defining therebetween an annular chamber 6 having a cylindrical inner diameter for rolling contact by a cylindrically shaped rotor assembly 7 which is unsupported and freely movable therein. The outer diameter 8 of the rotor assembly 7 is somewhat less than the inner diameter 9 of the rotor housing 2 thereby permitting limited movement of the rotor within the housing for a purpose to be subsequently explained.

Referring further to FIG. 1 and also to FIGS. 2 through 4, the rotor assembly 7 contains a plurality of circumferentially spaced radial slots 10 in which are disposed rotor vanes 11 biased into engagement with the inner periphery 9 of the rotor housing 2 by annular springs 24 or the like received in annular groves 28 in the rotor assembly 7 and slots 29 in the vanes 11. As shown, six such vanes 11 are provided, equally spaced around the periphery of the rotor assembly and biased into engagement with the rotor housing 2 to define therebetween a corresponding number of fluid chambers 12 through 17. However, it will be apparent that the number and spacing of vanes 11 may be varied within limits as desired. Radial passages 38 in the vanes 11 prevent fluid from being trapped in the slots 10.

Associated with each of the chambers 12 through 17 is a port 18 through 23 preferably contained within the rotor assembly 7 and adapted to communicate with porting 25 in the plate 4 and passages 26 in the drive shaft housing 27 for selectively communicating the various chambers with a fluid pressure source or a return. By proper selection of the pressure within the various chambers, the rotor assembly 7 can be held stationary against the inner periphery of the rotor housing 2 or caused to advance around the inner periphery. Thus, for example, if the ports 20 and 21 associated with the chambers 14 and 15 are vented and the same fluid pressure A is supplied to the other chambers 12, 13, 16 and 17 through their respective ports 18, 19, 22 and 23 as shown in FIG. 2, the net force $F_c$ acting on the rotor assembly 7 will maintain the rotor assembly in a steady state condition clamped against the inner periphery of the rotor housing intermediate the vented ports 20, 21. Such clamping force $F_c$ should be sufficient to maintain the rotor assembly against the inner periphery of the housing at all times without slipping. However, the rotor assembly 7 may also be provided with a dowel pin 30 projecting from the outer end of a central hub portion 31 extending through an enlarged opening 32 in the housing plate 5 for rolling contact with a similar dowel pin 33 extending inwardly from the end cap assembly 34 to assist in maintaining the rotor assembly against the inner periphery of the housing, and an external gear assembly 35 may be mounted on the hub portion 31 for engagement with an internal gear assembly 36 secured to the rotor housing 2 by suitable bolts 37 to assist in preventing slippage.

Now, should the pressure B in the chambers 12 and 13 be increased above that in the chambers 16 and 17 as shown in FIG. 3, a large torque-producing couple $F_G$ will be created in addition to the clamping force $F_c$, causing the rotor assembly 7 to rotate while being maintained in contact with the inner periphery of the rotor housing in the manner previously described, whereby the rotor will commence to roll around the inner periphery of the housing. As the rotor assembly 7 progresses from the FIG. 3 to the FIG. 4 position, a synchronous valving device, not shown, will cause a reduction in the pressure supplied to the chamber 12 to equal that in the chamber 17 (i.e. pressure A), an increase in the pressure in the chamber 14 to equal that in the chamber 13 (i.e. pressure B), and venting of the chamber 16, and so on, to produce chamber pressure changes synchronous with either rotor or output shaft speed, thereby creating a continuous torque-producing couple $F_G$ acting on the rotor assembly 7 to rotate the same.

Because the rotor assembly diameter 8 is only slightly smaller than the housing diameter 9, the rotor assembly 7 will rotate only a small amount for every complete pass around the inner periphery of the housing. By making the difference between the rotor assembly and housing diameters quite small, a large speed reduction will result. As an example, the rotor assembly 7 may have a diameter of 3″ and the diameter of the housing 2 may be 3.5″, in which event the ratio of the diameter of the housing to the diameter of the rotor assembly will be 7/6 and the rotor assembly will progress rotatively one vane chamber for every complete pass around the inner periphery of the housing where there are six such chambers. The result is a 6:1 speed reduction between the output shaft 40 and rotor assembly 7 to which the output shaft 40 may be coupled as by means of a universal drive shaft 41 having spherical ends 42 and 43 respectively received in recesses 44 and 45 in the rotor assembly 7 and output shaft 40. Pins 46 extending through transverse openings 47 in the ends of the drive shaft 41 and engaging slots 49 and 50 in the rotor assembly and output shaft key the various parts together. The output shaft 40 may be journaled in bearings 51 in the drive shaft housing 27, and the entire fluid vane motor 1 may be bolted to the housing 27, as desired.

As readily apparent from FIGS. 3 and 4, the torque-producing moment arm R through which the torque-producing couple $F_G$ acts is quite large, whereby the breakaway and running friction is relatively low, resulting in reduced wear of the motor parts and increased mechanical efficiency. Moreover, since the rotor assembly rotates at relatively low velocities, the effective rotor inertia is reduced, resulting in high acceleration capabilities, and the amount of fluid in the vane chambers is relatively low, making the fluid vane motor particularly suited for fast response pneumatic actuator systems.

Although the various chamber ports 18 through 23 and vanes 11 are shown in the rotor assembly, it will be readily apparent that they could be located in the housing, as shown in FIG. 5 if desired. Moreover, instead of causing the rotor assembly to move around the inner periphery of the housing, the rotor assembly 7 could be fixed by connecting the hub portion 31′ to one or more support stands 60 and the cylinder part 3′ mounted for free movement around the rotor assembly 7′ as shown in FIG. 6. In that event, the end plates 4′ and 5′ would be fixed to the rotor assembly 7′ as by keying the porting plate 4′ to the hub portion 31′ and connecting the end plates 4′ and 5′ together by means of dowel pins 61 with a spacer ring 62 therebetween. The cylinder part 3′ has a central hub portion 63 which projects through an enlarged opening 64 in the end plate 5′ for connection to the output shaft 40′ by the drive shaft 41′. Keyed to the central hub portion 63 outwardly of the end plate 5′ is the external gear assembly 35′ for engagement with the internal gear assembly 36′ which may be clamped to the end plate 5′ for assisting in preventing slippage between the cylinder part 3′ and rotor assembly 7′ during movement of the cylinder part 3′ around the rotor assembly. A pressure feed plate 64 may be secured to the porting plate 4′ for supplying the desired pressures to the various vane chambers. Otherwise, the details of construction and operation of the fluid vane motor 1′ of FIGS. 5 and 6 are substantially the same as that described in connection with FIGS. 1 through 4 and accordingly no further discussion is thought to be necessary. The same numbers followed by a prime symbol (′) are used to designate like parts.

I, therefore, particularly point out and distinctly claim as my invention:

1. A fluid vane motor comprising a housing, an annular chamber having a cylindrical inner diameter in said housing, a cylindrically shaped rotor in said chamber of lesser diameter than said chamber, a plurality of circumferentially spaced radial slots in one of said rotor and housing, vanes in said slots, means for biasing said vanes into engagement with the cylindrical surface of the other of said rotor and housing to define therebetween a corresponding number of fluid chambers, one of said rotor and housing being freely movable and the other being fixed, and means for sequentially varying the pressure in said fluid chambers to create a torque-producing couple acting on the movable one of said rotor and housing to cause the same to roll around the periphery of the fixed one of said rotor and housing.

2. The fluid vane motor of claim 1 wherein said circumferentially spaced radial slots are in said rotor, and said rotor is freely movable in said housing for movement by pressure supplied to said fluid chambers as aforesaid.

3. The fluid vane motor of claim 1 wherein said circumferentially spaced radial slots are in said rotor and said rotor is fixed, said housing being freely movable about said rotor by pressure supplied to said fluid chambers as aforesaid.

4. The fluid vane motor of claim 1 wherein said radial slots are in said housing and said rotor is freely movable in said housing by pressure supplied to said fluid chambers as aforesaid.

5. The fluid vane motor of claim 1 wherein said radial slots are in said housing and said rotor is fixed, said housing being freely movable about said rotor by pressure supplied to said fluid chambers as aforesaid.

6. The fluid vane motor of claim 1 wherein said rotor has a central hub portion projecting outwardly of said chamber, said hub portion and housing having mating gears thereon which assist in preventing slippage between said rotor and housing during such movement.

7. The fluid vane motor of claim 1 wherein said rotor has a central hub portion projecting outwardly of said chamber, said hub portion and housing having axially extending pins in rolling contact with each other which assist in maintaining the movable one of said rotor and housing in rolling engagement with the fixed one without slippage during such movement.

8. The fluid vane motor of claim 1 further comprising an output shaft, and a universal drive shaft means interconnecting said output shaft with the movable one of said rotor and housing for transmitting the rotational movement of said movable one of said rotor and housing to said output shaft, the outer diameter of said rotor being slightly smaller than the inner diameter of said housing, whereby the movable one of said rotor and housing rotates only a small amount for every complete pass around the periphery of the fixed one.

9. The fluid vane motor of claim 1 further comprising means externally of said chamber for assisting in preventing slippage between said rotor and housing during such movement.

10. The fluid vane motor of claim 1 wherein said means for sequentially varying the pressure in said fluid chambers includes a plurality of ports in the one of said rotor and housing containing said vanes, said plurality of ports being in communication with said fluid chambers, a stationary porting plate containing porting communicating with said plural ports, and means for selectively communicating said porting with fluid pressures of different magnitudes or with a return to vent selected ones of said fluid chambers.

11. The fluid vane motor of claim 1 wherein said means for biasing said vanes into engagement with the cylindrical surface of the other of said rotor and housing comprises annular springs received in annular grooves in one of said rotor and housing and slots in said vanes.

References Cited

UNITED STATES PATENTS

| 2,015,307 | 9/1935 | Hand | 91—56 |
| 2,695,597 | 11/1954 | Griffiths | 91—56 |
| 3,288,034 | 11/1966 | White et al. | 103—130(X) |
| 3,339,460 | 9/1967 | Birdwell | 91—56 |
| 3,358,653 | 12/1967 | Grimm | 91—70(X) |
| 3,437,009 | 4/1969 | Goodwyn | 91—70 |
| Re. 26,383 | 4/1968 | Huber | 91—56 |
| 3,071,115 | 1/1963 | Schott | 91—121(X) |
| 3,270,682 | 9/1966 | Charlson | 103—130 |
| 3,316,814 | 5/1967 | Charlson | 103—130(X) |
| 3,369,461 | 2/1968 | De Biasi | 91—73 |
| 3,443,378 | 5/1969 | Monroe et al. | 91—56(X) |

EVERETTE A. POWELL, JR., Primary Examiner